United States Patent
Ashikawa

(10) Patent No.: US 8,781,358 B2
(45) Date of Patent: Jul. 15, 2014

(54) IMAGE FORMING APPARATUS, IMAGE FORMING METHOD, COMPUTER PROGRAM PRODUCT, AND IMAGE FORMING SYSTEM

(75) Inventor: Yoshihisa Ashikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 158 days.

(21) Appl. No.: 13/401,217

(22) Filed: Feb. 21, 2012

(65) Prior Publication Data

US 2012/0213543 A1    Aug. 23, 2012

(30) Foreign Application Priority Data

Feb. 21, 2011   (JP) .................................. 2011-034924
Jan. 12, 2012   (JP) .................................. 2012-004064

(51) Int. Cl.
G03G 21/00       (2006.01)
G03G 15/08       (2006.01)
G03G 15/02       (2006.01)

(52) U.S. Cl.
CPC ........ *G03G 15/0898* (2013.01); *G03G 15/0291* (2013.01)
USPC ........................................................ 399/98

(58) Field of Classification Search
CPC ...................... G03G 15/0291; G03G 15/0898
USPC ..................................................... 399/98, 99
See application file for complete search history.

(56) References Cited

U.S. PATENT DOCUMENTS

2003/0108357 A1*  6/2003  Dinca et al. .................... 399/98
2005/0254835 A1* 11/2005  Takei ............................. 399/12
2007/0242983 A1* 10/2007  Sano ............................. 399/258

FOREIGN PATENT DOCUMENTS

JP    2003-150695    5/2003
JP    2006-317355   11/2006

OTHER PUBLICATIONS

Machine translation of Tatsuo, JP, 2003-150695, pub date May 23, 2003.*

* cited by examiner

*Primary Examiner* — Walter L Lindsay, Jr.
*Assistant Examiner* — Frederick Wenderoth
(74) *Attorney, Agent, or Firm* — Oblon, Spivak, McClelland, Maier & Neustadt, L.L.P.

(57) ABSTRACT

An image forming apparatus includes a developing unit configured to supply a toner onto a surface of an image carrier to form a toner image carried from a toner container; a transfer unit configured to transfer the toner image onto a transfer medium; a cleaning unit configured to collect a non-transferred toner that is not transferred onto the transfer medium during the transfer by the transfer unit; a recycle unit configured to carry the non-transferred toner to the developing unit; a non-transferred-toner-amount detecting unit configured to detects an amount of the non-transferred toner; a total-toner-amount calculating unit configured to calculates an amount of the toner carried from the toner container; a consumed-toner-amount calculating unit configured to calculate, based on the amounts, a consumed toner amount; and an environmental-load-information calculating unit configured to calculate, based on the consumed toner amount, environmental load information.

11 Claims, 14 Drawing Sheets

IMAGE FORMING APPARATUS, IMAGE FORMING METHOD, COMPUTER PROGRAM PRODUCT, AND IMAGE FORMING SYSTEM

CROSS-REFERENCE TO RELATED APPLICATIONS

The present application claims priority to and incorporates by reference the entire contents of Japanese Patent Application No. 2011-034924 filed in Japan on Feb. 21, 2011 and Japanese Patent Application No. 2012-004064 filed in Japan on Jan. 12, 2012.

BACKGROUND OF THE INVENTION

1. Field of the Invention

The present invention relates to an image forming apparatus, an image forming method, a computer program product, and an image forming system.

2. Description of the Related Art

A technology for calculating environmental load information indicating a load imposed on the environment in a process from the production until the disposal of a product is known. For example, Japanese Patent Application Laid-open No. 2003-150695 discloses an image forming apparatus that calculates environmental load information during image formation. More specifically, the image forming apparatus disclosed in Japanese Patent Application conditions and the number of dots of image data, a toner amount consumed during image formation and calculates a $CO_2$ emission amount (environment load information) from the calculated toner amount.

However, in the technology disclosed in Japanese Patent Application Laid-open No. 2003-150695, the image forming apparatus calculates a toner amount consumed during image formation without taking into account at all an amount of a non-transferred toner not transferred onto transfer media (e.g., an intermediate transfer belt and recording paper) during transfer of a toner image. Therefore, the calculation accuracy of the environmental load information is insufficient.

Therefore, there is a need for an image forming apparatus, an image forming method, a computer program product, and an image forming system that can improve the calculation accuracy of environmental load information.

SUMMARY OF THE INVENTION

It is an object of the present invention to at least partially solve the problems in the conventional technology.

According to an embodiment, there is provided an image forming apparatus that includes an image carrier; a developing unit configured to supply a toner onto a surface of the image carrier to form a toner image, the toner being carried from a toner container; a transfer unit configured to transfer the toner image formed by the developing unit onto a transfer medium; a cleaning unit configured to collect a non-transferred toner that is not transferred onto the transfer medium during the transfer by the transfer unit; a recycle unit configured to carry the non-transferred toner collected by the cleaning unit to the developing unit; a non-transferred-toner-amount detecting unit configured to detects a non-transferred toner amount indicating an amount of the non-transferred toner; a total-toner-amount calculating unit configured to calculates a total toner amount indicating an amount of the toner carried from the toner container; a consumed-toner-amount calculating unit configured to calculate, based on the total toner amount calculated by the total-toner-amount calculating unit and the non-transferred toner amount detected by the non-transferred-toner-amount detecting unit, a consumed toner amount indicating an amount of the toner consumed during the formation of the toner image; and an environmental-load-information calculating unit configured to calculate, based on the consumed toner amount calculated by the consumed-toner-amount calculating unit, environmental load information indicating a load imposed on an environment.

According to another embodiment, there is provided an image forming method that includes supplying a toner onto a surface of an image carrier to form a toner image, the tonner being carried from a toner container; transferring the formed toner image onto a transfer medium; collecting a non-transferred toner that is not transferred onto the transfer medium during the transferring; reusing the collected non-transferred toner to form the toner image; detecting a non-transferred toner amount indicating an amount of the non-transferred toner; calculating a total toner amount indicating an amount of the toner carried from the toner container; calculating, based on the calculated total toner amount and the detected non-transferred toner amount, a consumed toner amount indicating an amount of the toner consumed during the formation of the toner image; and calculating, based on the calculated consumed toner amount, environmental load information indicating a load imposed on an environment.

According to still another embodiment, there is provided a computer program product including a non-transitory computer readable medium including programmed instructions. The instructions cause a computer to execute the image forming method according to the above embodiment.

According to still another embodiment, there is provided an image forming system that includes an image forming apparatus and a server apparatus. The image forming system includes an image carrier; a developing unit configured to supply a toner onto a surface of the image carrier to form a toner image, the toner being carried from a toner container; a transfer unit configured to transfer the toner image formed by the developing unit onto a transfer medium; a cleaning unit configured to collect a non-transferred toner that is not transferred onto the transfer medium during the transfer by the transfer unit; a recycle unit configured to carry the non-transferred toner collected by the cleaning unit to the developing unit; a non-transferred-toner-amount detecting unit configured to detects a non-transferred toner amount indicating an amount of the non-transferred toner; a total-toner-amount calculating unit configured to calculates a total toner amount indicating an amount of the toner carried from the toner container; a consumed-toner-amount calculating unit configured to calculate, based on the total toner amount calculated by the total-toner-amount calculating unit and the non-transferred toner amount detected by the non-transferred-toner-amount detecting unit, a consumed toner amount indicating an amount of the toner consumed during the formation of the toner image; and an environmental-load-information calculating unit configured to calculate, based on the consumed toner amount calculated by the consumed-toner-amount calculating unit, environmental load information indicating a load imposed on an environment. The image forming apparatus includes at least the image carrier, the developing unit, the transfer unit, the cleaning unit, and the recycle unit. The server apparatus includes at least one of the non-transferred-toner-amount detecting unit, the total-toner-amount calculating unit, the consumed-toner-amount calculating unit, and the environmental-load-information calculating unit.

The above and other objects, features, advantages and technical and industrial significance of this invention will be

DETAILED DESCRIPTION OF THE PREFERRED EMBODIMENTS

Embodiments of an image forming apparatus, an image forming method, a computer program, and an image forming system according to the present invention will be explained in detail below with reference to the accompanying drawings. A color image forming apparatus in the embodiments is generally referred as multifunction peripheral including at least two functions among a copy function, a printer function, a scanner function, and a facsimile function. As explained in detail later, the color image forming apparatus in the embodiments can display environmental load information (a $CO_2$ emission amount) during image formation.

First Embodiment

Figure 1:
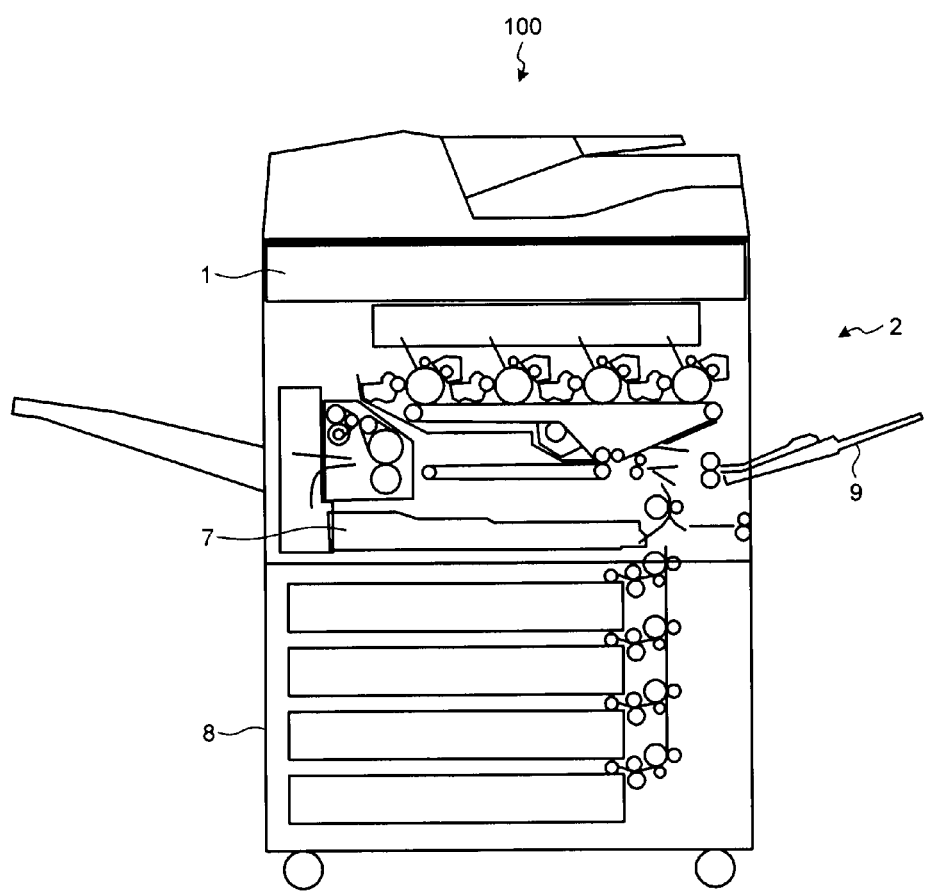
FIG. 1 is a diagram of a schematic configuration example of a color image forming apparatus according to a first embodiment.

FIG. 1 is a diagram of a schematic configuration example of a color image forming apparatus 100 of an electrophotographic system according to a first embodiment. As shown in FIG. 1, the color image forming apparatus 100 includes a scanner unit 1 functioning as an image reading device and an image forming unit 2. A main body paper feeding tray 7 and a bank paper feeding tray 8 are provided in a lower part of the image forming unit 2. Further, a manual feed tray 9 is provided in a main body unit of the color image forming apparatus 100.

The scanner unit 1 reads a reading target original document and generates image data. More specifically, the scanner unit 1 photoelectrically converts reflected light from an exposed original document and performs signal processing to thereby generate image data.

Figure 2:
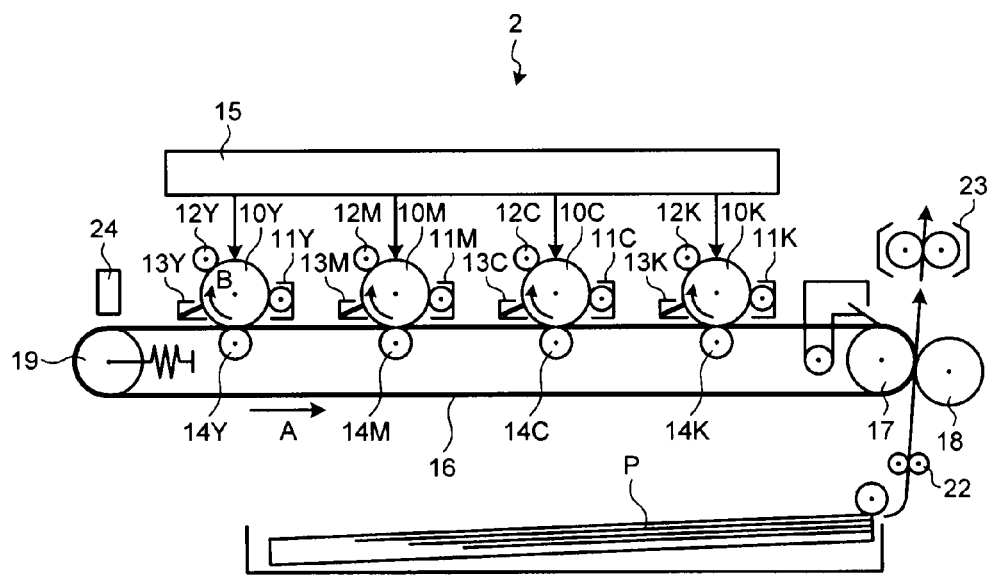
FIG. 2 is a schematic diagram of an example of the configuration of an image forming unit.

FIG. 2 is a schematic diagram of an example of the configuration of the image forming unit 2. The image forming unit 2 includes four photosensitive drums (image carriers) 10Y, 10M, 10C, and 10K, a plurality of developing devices 11Y, 11M, 11C, and 11K that respectively develop latent images formed on the surfaces of the photosensitive drums into toner images of colors different from one another, an exposing device 15, and an intermediate transfer belt (transfer medium) 16 onto which the toner images of the different colors are transferred (primarily transferred) to be superimposed one on top of another.

The intermediate transfer belt 16 is an endless belt and supported by two shafts of a driving roller 17 and a tension roller 19. On the upper side of the intermediate transfer belt 16, the four photosensitive drums 10 for colors of black (K), cyan (C), magenta (M), and yellow (Y) are arranged in order along a turning direction A of the intermediate transfer belt 16. A developing device 11, a charging device 12, a cleaning device 13, and a primary transfer roller 14 included in a primary transfer device are arranged around the photosensitive drum 10. An exposing device 15 is arranged above the photosensitive drum 10. Hereinafter, each of the photosensitive drums 10Y, 10M, 10C, and 10K is simply referred to as the photosensitive drum 10; each of the developing units 11Y, 11M, 11C, and 11K as the developing unit 11; each of charging units 12Y, 12M, 12C, and 12K as the charging unit 12; each of cleaning units 13Y, 13M, 13C, and 13K as the cleaning unit 13; and each of primary transfer rollers 14Y, 14C, 14M, and 14K as the primary transfer roller 13.

The photosensitive drums 10 are driven to rotate in a B direction in FIG. 2. The charging device 12 charges the surfaces of the photosensitive drum 10 to a predetermined polarity. Laser beams emitted from the exposing device 15 are irradiated on the charged surfaces. Consequently, electrostatic latent images are formed on the surfaces of the photosensitive drums 10. The developing device 11 visualizes, with toners carried from not-shown toner containers, the electrostatic latent image formed on the surface of the photosensitive drum 10. Consequently, a toner image is formed on the surface of the photosensitive drum 10.

The primary transfer roller 14 is respectively arranged to be opposed to the photosensitive drum 10. The intermediate transfer belt 16 turns in a state in which the intermediate transfer belt 16 is held between the primary transfer roller 14 and the photosensitive drum 10. The toner image formed on the surface of the photosensitive drum 10 is transferred (primarily transferred) onto the intermediate transfer belt 16 by the action of the primary transfer roller 14. In this way, toner images of black, cyan, magenta, and yellow are sequentially transferred to be accurately superimposed on top of another on the intermediate transfer belt 16 and a full-color combined color image is formed. After the primary transfer, non-transferred toners remaining on the surfaces of the photosensitive drums 10 without being transferred onto the intermediate transfer belt 16 are collected by the cleaning devices 13.

Figure 3:
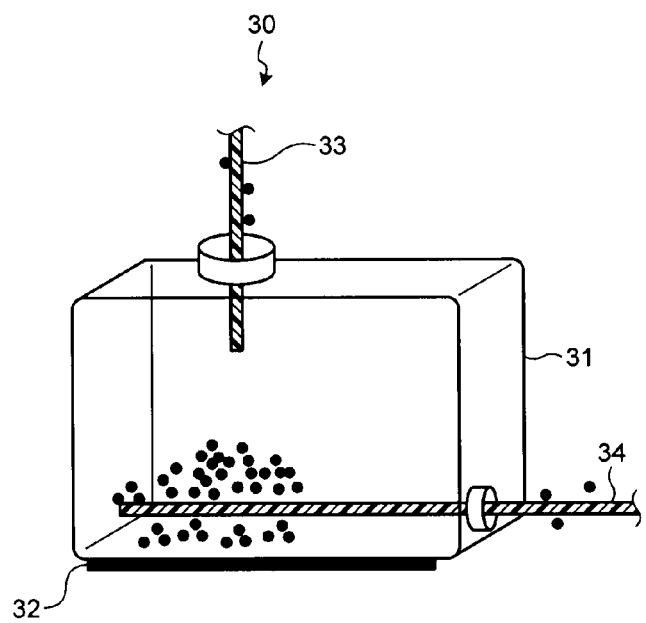
FIG. 3 is a diagram of an example of a schematic configuration of a toner recycle mechanism.

In this embodiment, the image forming apparatus 100 includes a toner recycle mechanism that conveys the non-transferred toners collected by the cleaning device 13 to the developing device 11. FIG. 3 is a diagram of an example of a schematic configuration of a toner recycle mechanism 30 according to this embodiment. As shown in FIG. 3, the toner recycle mechanism 30 includes a recycle toner collection container 31, a weight detection sensor 32, a screw 33, and a screw 34. The screws 33 and 34 are respectively driven to rotate by not-shown driving motors. The screw 33 is driven to rotate, whereby the non-transferred toners collected by the cleaning device 13 shown in FIG. 2 are carried to the recycle toner collection container 31. On the other hand, the screw 34 is driven to rotate, whereby the recycle toners collected in the recycle toner collection container 31 are carried to the developing device 11.

The recycle toner collection container 31 is placed on a not-shown table. The weight detection sensor 32 including, for example, a load cell is attached to the bottom surface of the recycle toner collection container 31. The weight of the recycle toner collection container 31 is detected by the weight detection sensor 32. In this embodiment, the weight of the recycle toner collection container 31 is measured by the weight detection sensor 32. However, this is not a limitation. A toner amount (a non-transferred toner amount) in the recycle toner collection container 31 can be detected by, for example, a toner density sensor or a toner residual amount sensor.

Referring back to FIG. 2, a secondary transfer roller (transfer unit) 18 is arranged to be opposed to the driving roller 17 (a secondary transfer opposed roller) across the intermediate transfer belt 16. When recording paper P, which is a recording medium, is fed from a paper feeding tray, the recording paper P is sent into between the driving roller 17 and the secondary transfer roller 18 at predetermined timing according to the rotation of a registration roller pair 22. The combined color image born on the intermediate transfer belt 16 is collectively transferred onto the recording paper P by the action of the secondary transfer roller 18. The toner images transferred onto the recording paper P are fixed with heat and pressure by a fixing device 23. The recording paper P is discharged onto a not-shown paper discharge tray.

In this embodiment, an example of a system for transferring the combined color image onto transfer paper via the secondary transfer roller is explained above. However, this is not a limitation. An image forming apparatus adopting a system for directly transferring the combined color image onto the recording paper P can be used.

Figure 4:
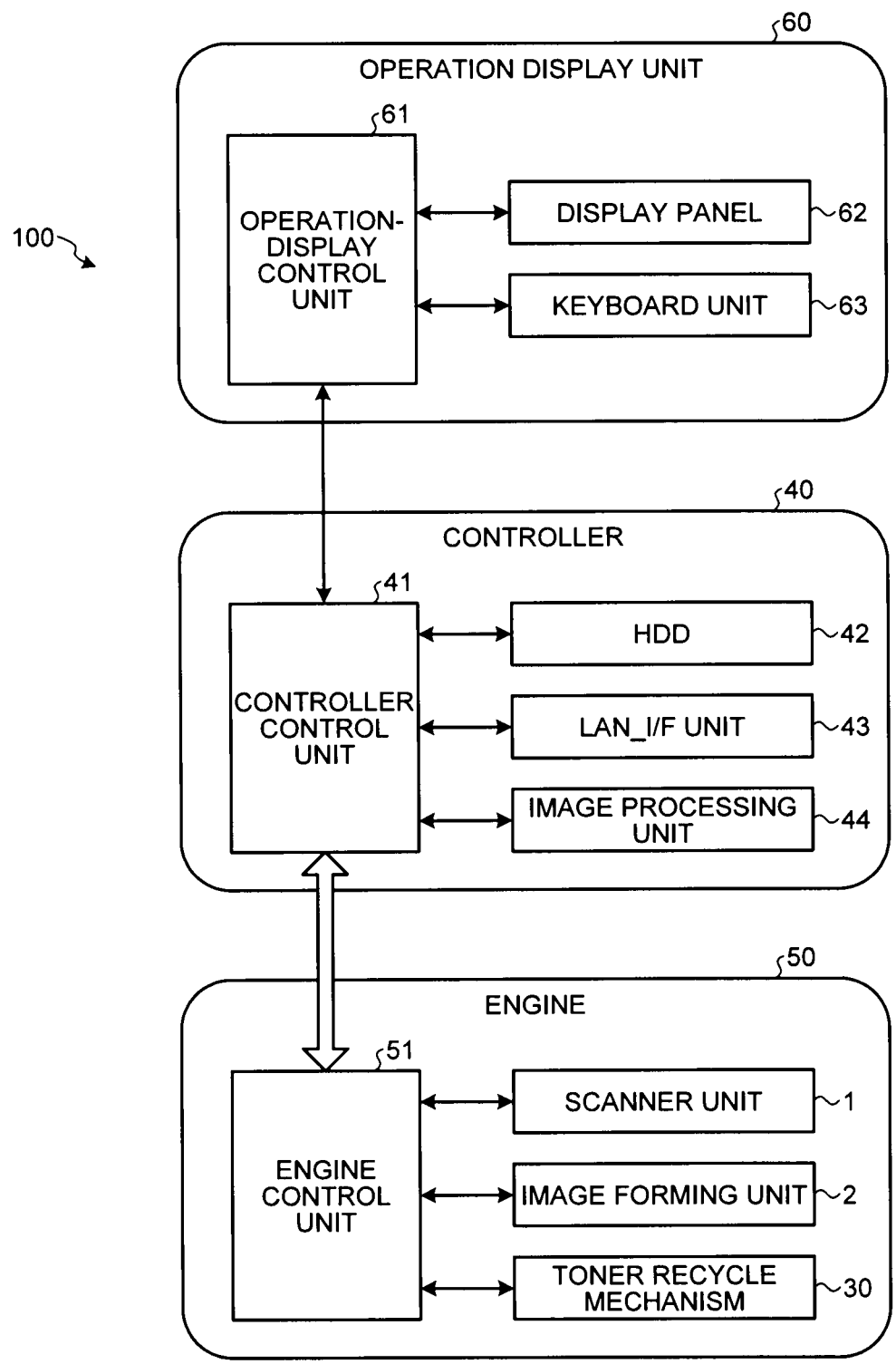
FIG. 4 is a diagram of a hardware configuration example of the color image forming apparatus.

FIG. 4 is a diagram of a hardware configuration example of the color image forming apparatus 100 according to this embodiment. As shown in FIG. 4, the color image forming apparatus 100 includes a controller 40, an engine 50, and an operation display unit 60.

The controller 40 is means for controlling the entire color image forming apparatus 100. As shown in FIG. 4, the controller 40 includes a controller control unit 41, a HDD 42, a LAN_I/F unit 43, and an image processing unit 44. The controller control unit 41 is a computer including a CPU, an ASIC that controls CPU peripherals such as a ROM, a RAM, and a FIFO, and an interface circuit. The CPU of the controller control unit 41 executes a predetermined control program stored in the ROM or the like to thereby control the entire color image forming apparatus 100. The HDD 42 is means for storing image data and the like. The LAN_I/F unit 43 is means for performing communication with the outside and can receive, for example, printing data (image data) transmitted from an external PC. The image processing unit 44 is means for applying image processing to image data sent to the controller 40. For example, the image processing unit 44 applies arbitrary image processing such as gamma correction or magnification change processing to the image data received from the external PC.

As shown in FIG. 4, the engine 50 includes an engine control unit 51, the scanner unit 1, the image forming unit 2, and the toner recycle mechanism 30. The engine control unit 51 is a computer including a CPU, an ASIC that controls CPU peripherals such as a ROM, a RAM, and an FIFO, and an interface circuit. The CPU of the engine control unit 51 executes a predetermined control program stored in the ROM or the like to thereby control the entire engine 50. The engine 50 performs, under the control by the controller 40, a printing operation (an image forming operation) for transferring image data received from the controller 40 and image data of an original document read by the scanner unit 1 onto the recording paper P.

The operation display unit 60 is means for displaying an operation situation and a state of the color image forming apparatus 100 and receiving an operation input from a user. As shown in FIG. 4, the operation display unit 60 includes an operation-display control unit 61, a display panel 62, and a keyboard unit 63. The operation-display control unit 61 is a computer including a CPU, an ASIC that controls CPU peripherals such as a ROM, a RAM, and a FIFO, and an interface circuit. The CPU of the operation-display control unit 60 executes a predetermined control program stored in the ROM or the like to thereby control the entire operation display unit 60. The display panel 62 is means for displaying an operation situation and a state of the color image forming apparatus 100 and receiving a touch input from the user. The display panel 62 includes, for example, a liquid crystal touch panel. The keyboard unit 63 is means for receiving a key input from an operator.

The controller control unit 41, the engine control unit 51, and the operation-display control unit 61 can operate independently from one another (can perform distributed processing). The control units are connected by a bus or, for example, a serial I/F.

Figure 5:
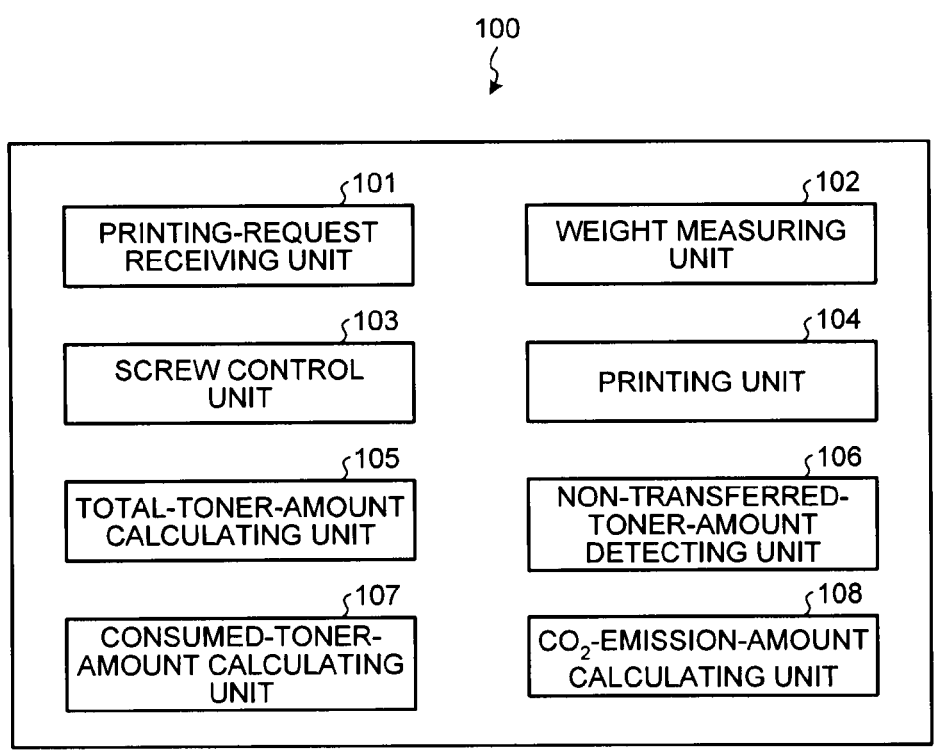
FIG. 5 is a block diagram of an example of a functional configuration of the color image forming apparatus according to the first embodiment.

FIG. 5 is a block diagram of an example of a functional configuration of the color image forming apparatus 100 according to this embodiment. Functional blocks shown in FIG. 5 indicate functions realized by the controller control unit 41, the engine control unit 51, and the operation-display control unit 61 respectively executing the predetermined control programs. In short, the functional blocks shown in FIG. 5 indicate an example of functions realized by execution of a computer program in this embodiment. As shown in FIG. 5, the color image forming apparatus 100 includes a printing-request receiving unit 101, a weight measuring unit 102, a screw control unit 103, a printing unit 104, a total-toner-amount calculating unit 105, a non-transferred-toner-amount detecting unit 106, a consumed-toner-amount calculating unit 107, and a $CO_2$-emission-amount calculating unit 108.

The printing-request receiving unit 101 receives a printing request in a job unit. Here, one job indicates a series of printing operation executed according to one command. The weight measuring unit 102 measures the weight of the recycle toner collection container 31. The screw control unit 103 controls the activation and the stop of the screws 33 and 34. The printing unit 104 executes a printing operation corresponding to a printing request received by the printing-request receiving unit 101. The total-toner-amount calculating unit 105 calculates a total toner amount indicating an amount of a toner carried from a toner container. The non-transferred-toner-amount detecting unit 106 detects a non-transferred toner amount (a recycle toner amount) indicating an amount of a non-transferred toner collected in the recycle toner collection container 31. The consumed-toner-amount calculating unit 107 calculates a consumed toner amount indicating an amount of a toner consumed (transferred onto a transfer medium) during formation of a toner image. The $CO_2$-emission-amount calculating unit 108 calculates a $CO_2$ emission amount from the consumed toner amount calculated by the consumed-toner-amount calculating unit 107.

Figure 6:
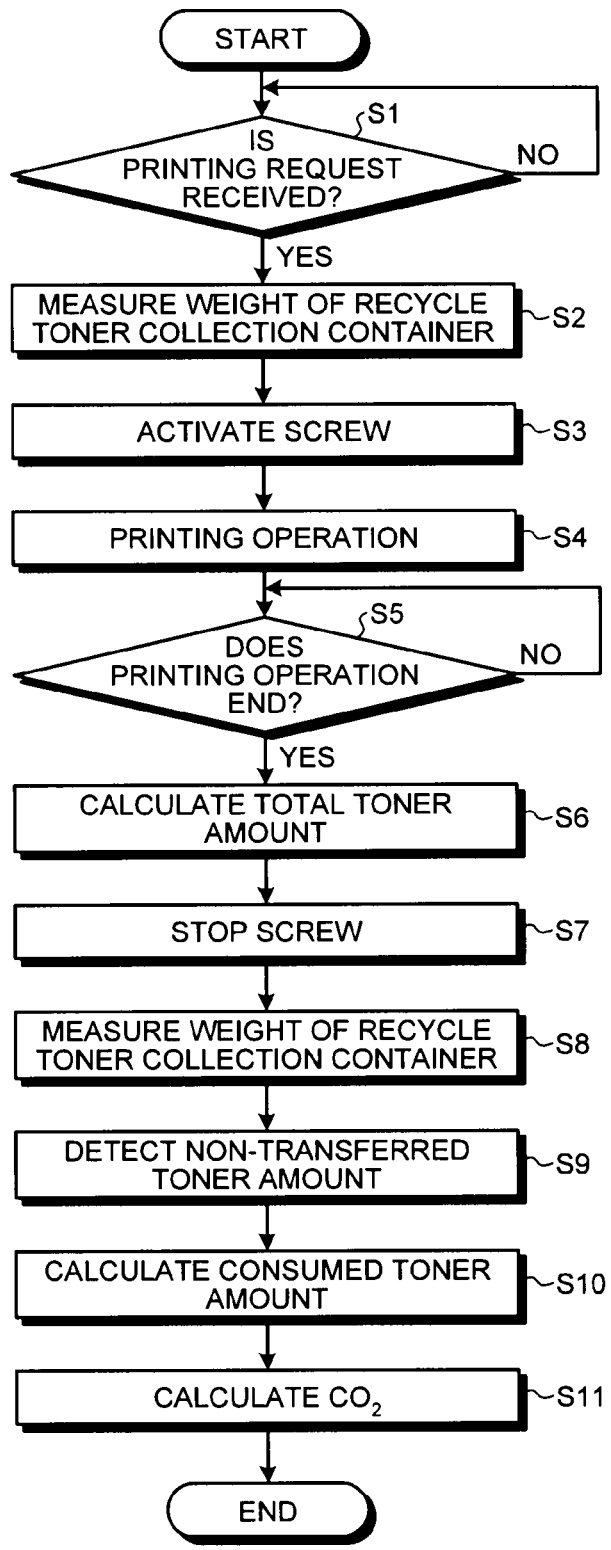
FIG. 6 is a flowchart for explaining an example of $CO_2$ emission amount calculation processing executed by the color image forming apparatus according to the first embodiment.

FIG. 6 is a flowchart for explaining an example of $CO_2$ emission amount calculation processing executed for each one job by the color image forming apparatus 100 according to this embodiment. As shown in FIG. 6, first, at step S1, the printing-request receiving unit 101 (see FIG. 5) determines whether the printing-request receiving unit 101 receives a printing request in a job unit. When the printing-request receiving unit 101 receives the printing request, the processing shifts to the next step S2. At step S2, the weight measuring unit 102 (see FIG. 5) measures the weight of the recycle toner collection container 31. At the next step S3, the screw control unit 103 (see FIG. 5) activates the screw 33.

At the next step S4, the printing unit 104 (see FIG. 5) performs a printing operation corresponding to the printing request received by the printing-request receiving unit 101. The printing unit 104 determines whether the printing operation is completed (step S5). When the printing unit 104 determines that the printing operation is completed, the processing shifts to step S6.

At step S6, the total-toner-amount calculating unit 105 (see FIG. 5) calculates a total toner amount. More specifically, the total-toner-amount calculating unit 105 calculates a total toner amount based on the number of revolutions of a motor for carrying out the toner from the toner container. At the next step S7, the screw control unit 103 stops the screw 33. At the next step S8, the weight measuring unit 102 measures the weight of the recycle toner collection container 31.

At the next step S9, the non-transferred-toner-amount detecting unit 106 (see FIG. 5) detects a non-transferred toner amount. More specifically, the non-transferred-toner-amount detecting unit 106 detects (calculates), as a non-transferred toner amount, a differential value between the weight value of the recycle toner collection container 31 measured at step S8 and the weight value of the recycle toner collection container 31 measured at step S2.

At the next step S10, the consumed-toner-amount calculating unit 107 (see FIG. 5) calculates a consumed toner amount. More specifically, the consumed-toner-amount calculating unit 107 calculates, as a consumed toner amount, a differential value between the total toner amount calculated at step S6 and the non-transferred toner amount detected (calculated) at step S9.

After step S10, the processing shifts to step S11. At step S11, the $CO_2$-emission-amount calculating unit 108 (see FIG. 5) calculates a $CO_2$ emission amount. More specifically, the $CO_2$-emission-amount calculating unit 108 multiplies the consumed toner amount calculated at step S10 with a $CO_2$ emission amount per unit weight of a toner set in advance to calculate a $CO_2$ emission amount involved in toner consumption in the job. The $CO_2$ emission amount calculation processing in one job ends. In this embodiment, the $CO_2$ emission amount calculated for each one job is displayed on the display panel 62 of the operation display unit 60.

As explained above, in this embodiment, a $CO_2$ emission amount is calculated from a consumed toner amount, which is a differential value between a total toner amount and a non-transferred toner amount. Therefore, compared with a configuration for calculating a $CO_2$ emission amount without taking into account a non-transferred toner amount at all, there is an advantageous effect that it is possible to improve the calculation accuracy of a $CO_2$ emission amount.

Second Embodiment

A color image forming apparatus according to a second embodiment is explained. A hardware configuration of the color image forming apparatus according to the second embodiment is the same as that in the first embodiment explained above. Therefore, detailed explanation of the hardware configuration is omitted. In the following explanation, differences from the first embodiment are mainly explained. Repetition of the explanation of the first embodiment is omitted as appropriate.

Figure 7:
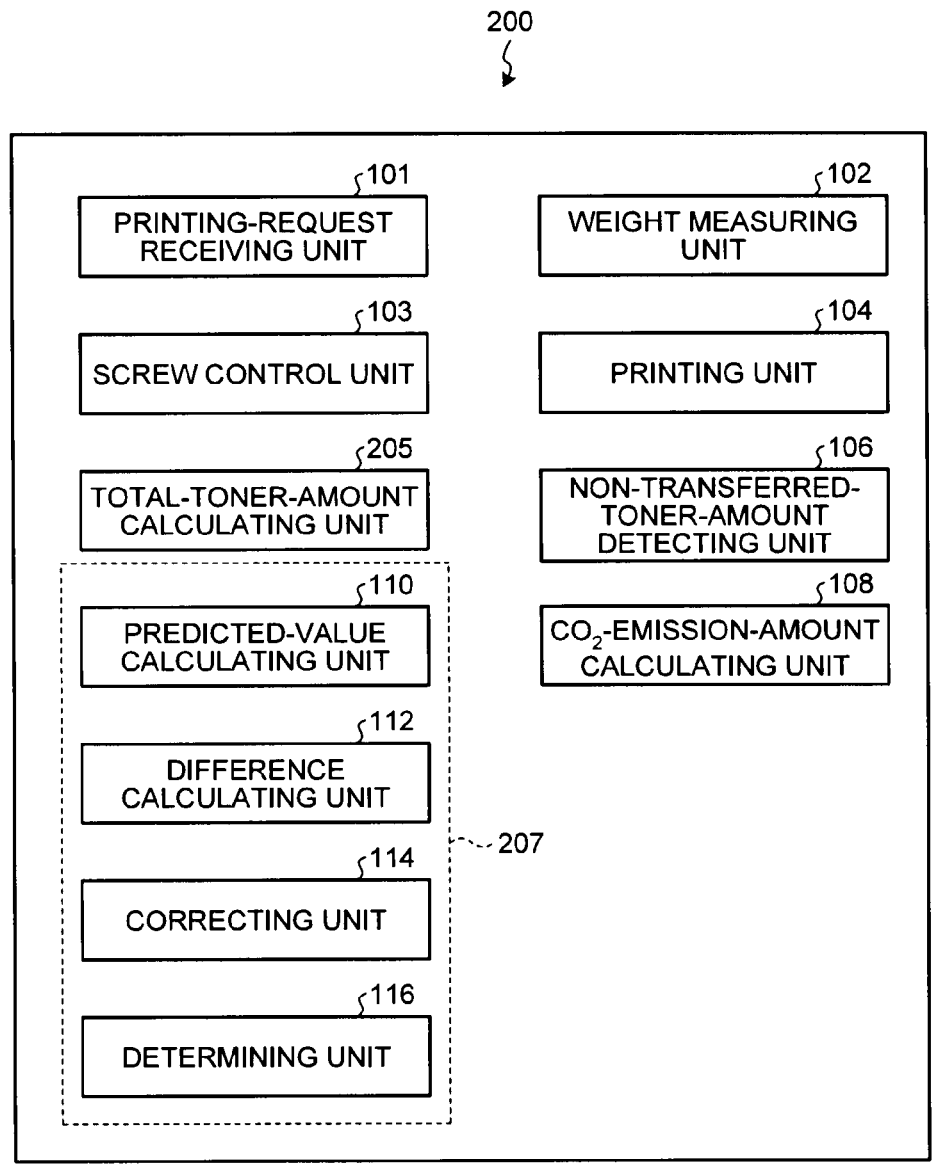
FIG. 7 is a block diagram of an example of a functional configuration of a color image forming apparatus according to a second embodiment.

FIG. 7 is a block diagram of an example of a functional configuration of the color image forming apparatus 200 according to the second embodiment. The second embodiment is different from the first embodiment in that a total-toner-amount calculating unit 205 calculates a total toner amount from image data and image forming conditions and a consumed-toner-amount calculating unit 207 includes a predicted-value calculating unit 110, a difference calculating unit 112, a correcting unit 114, and a determining unit 116.

The predicted-value calculating unit 110 calculates, based on a total toner amount calculated by the total-toner-amount calculating unit 205 and a transfer ratio determined from experiment data or the like in advance, predicted values of a consumed toner amount and a non-transferred toner amount. In this embodiment, the transfer ratio set in advance is 90% (a non-transfer ratio is 10%). However, this is not a limitation. A value of the transfer ratio is arbitrary. The difference calculating unit 112 calculates a differential value between the predicted value of the non-transferred toner amount calculated by the predicted-value calculating unit 110 and the non-transferred toner amount detected by the non-transferred-toner-amount detecting unit 106. The correcting unit 114 corrects, according to the differential value calculated by the difference calculating unit 112, the predicted value of the consumed toner amount calculated by the predicted-value calculating unit 110. The determining unit 116 determines, as a value (a calculated value) of the consumed toner amount, a predicted value of the consumed toner amount after being corrected by the correcting unit 114.

Figure 8:
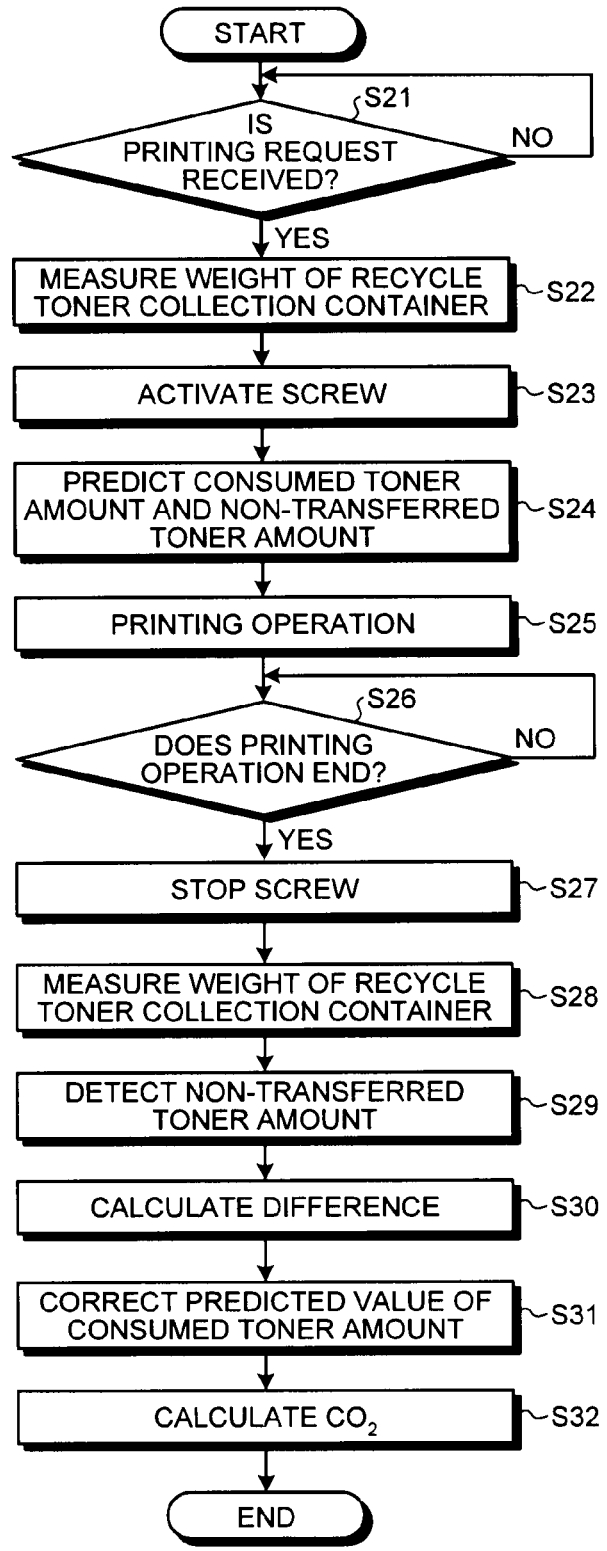
FIG. 8 is a flowchart for explaining an example of $CO_2$ emission amount calculation processing executed by the color image forming apparatus according to the second embodiment.

FIG. 8 is a flowchart for explaining an example of $CO_2$ emission amount calculation processing executed for each one job by the color image forming apparatus 200 according to the second embodiment. Contents of steps S21 to S23 in FIG. 8 are the same as the contents of steps S1 to S3 in FIG. 6. Therefore, detailed explanation of the contents of steps S21 to S23 is omitted. As shown in FIG. 8, at step S24, the total-toner-amount calculating unit 205 calculates a total toner amount from image data and image forming conditions; and the predicted-value calculating unit 110 (see FIG. 7) of the consumed-toner-amount calculating unit 207 calculates, based on the total toner amount calculated by the total-toner-amount calculating unit 205 and a predetermined transfer ratio (in this embodiment, 90%), predicted values of a consumed toner amount and a non-transferred toner amount.

More specifically, processing at step S24 is as explained below. At step S24, the total-toner-amount calculating unit 205 calculates, according to image forming conditions such as printing density and magnification input via the display panel 62, the keyboard unit 63, the LAN_I/F unit 43, and the like, a toner amount necessary per one dot of an image (an amount of a toner that should be carried from a toner container). The total-toner-amount calculating unit 205 calculates, as a total toner amount, a value obtained by multiplying together the toner amount necessary per one dot of an image and a total number of dots of image data to be printed. The predicted-value calculating unit 110 multiplies the total toner amount calculated by the total-toner-amount calculating unit 205 with a predetermined transfer ratio (in this embodiment, 0.9) to calculate a predicted value of a consumed toner amount. The predicted-value calculating unit 110 multiplies the total toner amount with a predetermined non-transfer ratio (in this embodiment, 0.1) to calculate a predicted value of a non-transferred toner amount.

Contents of steps S25 to S29 after step S24 are the same as the contents of steps S4 to S9 excluding step S6 in FIG. 6. Therefore, detailed explanation of the contents of steps S25 to S29 is omitted. As shown in FIG. 8, at step S30, the difference calculating unit 112 of the consumed-toner-amount calculating unit 207 calculates a differential value between the predicted value of the non-transferred toner amount calculated at step S24 and the non-transferred toner amount detected at step S29.

At the next step S31, the correcting unit 114 of the consumed-toner-amount calculating unit 207 corrects, using the differential value calculated at step S30, the predicted value of the consumed toner amount calculated at step S24. In this embodiment, when the non-transferred toner amount detected at step S29 is larger than the predicted value of the non-transferred toner amount calculated at step S24, the correcting unit 114 subtracts the differential value (an absolute value) calculated at step S30 from the predicted value of the consumed toner amount calculated at step S24 to correct the predicted value of the consumed toner amount. On the other hand, when the non-transferred toner amount detected at step S29 is smaller than the predicted value of the non-transferred toner amount calculated at step S24, the correcting unit 114 adds the differential value (an absolute value) calculated at step S30 to the predicted value of the consumed toner amount calculated at step S24 to correct the predicted value of the consumed toner amount.

The correction by the correcting unit 114 is explained below with reference to a specific example. It is assumed that the predicted value of the consumed toner amount and the predicted value of the non-transferred toner amount calculated at step S24 in FIG. 8 are respectively "90" and "10" and, on the other hand, the non-transferred toner amount detected at step S29 in FIG. 8 is "15". In this case, the differential value calculated at step S30 is "5" and the non-transferred toner amount detected at step S29 is larger than the predicted value of the non-transferred toner amount calculated at step S24. Therefore, the correcting unit 114 subtracts the differential value "5" calculated at step S30 from the predicted value "90" of the consumed toner amount calculated at step S24. Consequently, a predicted value of the consumed toner amount after the correction is "85". Further, it is assumed that the predicted value of the consumed toner amount and the predicted value of the non-transferred toner amount calculated at step S24 in FIG. 8 are respectively "90" and "10" and, on the other hand, the non-transferred toner amount detected at step S29 in FIG. 8 is "5". In this case, the differential value calculated at step S30 is "5" and the non-transferred toner amount detected at step S29 is smaller than the predicted value of the non-transferred toner amount calculated at step S24. Therefore, the correcting unit 114 adds the differential value "5" to the predicted value "90" of the consumed toner amount calculated at step S24. Consequently, a predicted value of the consumed toner amount after the correction is "95".

The determining unit 116 of the consumed-toner-amount calculating unit 207 determines the predicted value of the consumed toner amount after the correction by the correcting unit 114 as a value of the consumed toner amount. Contents of step S31 are as explained above. After step S31, the processing shifts to step S32. At step S32, the $CO_2$-emission-amount calculating unit 108 (see FIG. 7) calculates a $CO_2$ emission amount from the consumed toner amount calculated at step S31. Contents of step S32 are the same as the contents of step S11 in FIG. 6. Therefore, detailed explanation of the contents of step S32 is omitted.

As explained above, in the second embodiment, it is possible to improve the calculation accuracy of a consumed toner amount by correcting a predicted value of the consumed toner amount using a differential value between a predicted value of a non-transferred toner amount and a detected value of the non-transferred toner amount. Consequently, it is possible to improve the calculation accuracy of a $CO_2$ emission amount.

Third Embodiment

A color image forming apparatus according to a third embodiment is explained below. The color image forming apparatus according to the third embodiment is different from the hardware configurations in the first and second embodiments as explained below. The image forming apparatus incorporates a post-processing machine (not shown) that can print a $CO_2$ emission amount calculated for each one job on the recording paper P after a toner image is transfer thereon (after an image forming operation by the image forming unit 2 is performed).

Figure 9:
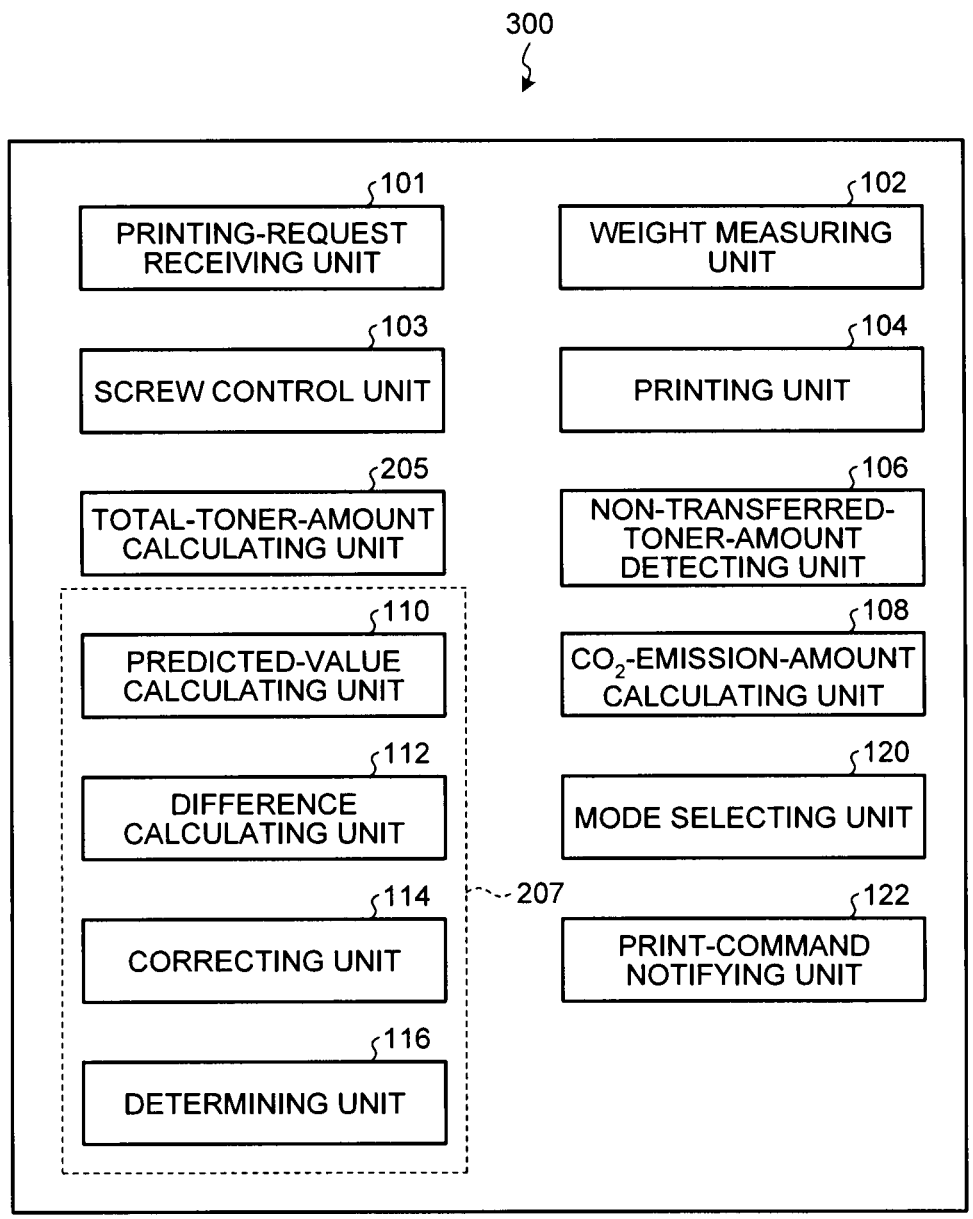
FIG. 9 is a block diagram of an example of a functional configuration of a color image forming apparatus according to a third embodiment.

FIG. 9 is a block diagram of an example of a functional configuration of the color image forming apparatus 300 according to the third embodiment. The third embodiment is different from the second embodiment in that the color image forming apparatus 300 further includes a mode selecting unit 120 and a print-command notifying unit 122. The mode selecting unit 120 selects, according to an operation input from a user, any one of a print mode (a first mode) for causing the post-processing machine (printing unit) to execute print and a non-print mode (a second mode) for not causing the post-processing machine to execute print. When the print mode is selected by the mode selecting unit 120, the print-command notifying unit 122 notifies the post-processing machine of a print command for instructing print of a $CO_2$ emission amount calculated by the $CO_2$-emission-amount calculating unit 108. On the other hand, when the non-print mode is selected by the mode selecting unit 120, the print-command notifying unit 122 does not notify the post-processing machine of the print command. The other contents of the functional configuration are the same as those in the second embodiment. Therefore, detailed explanation of the contents of the functional configuration is omitted.

Figure 10:
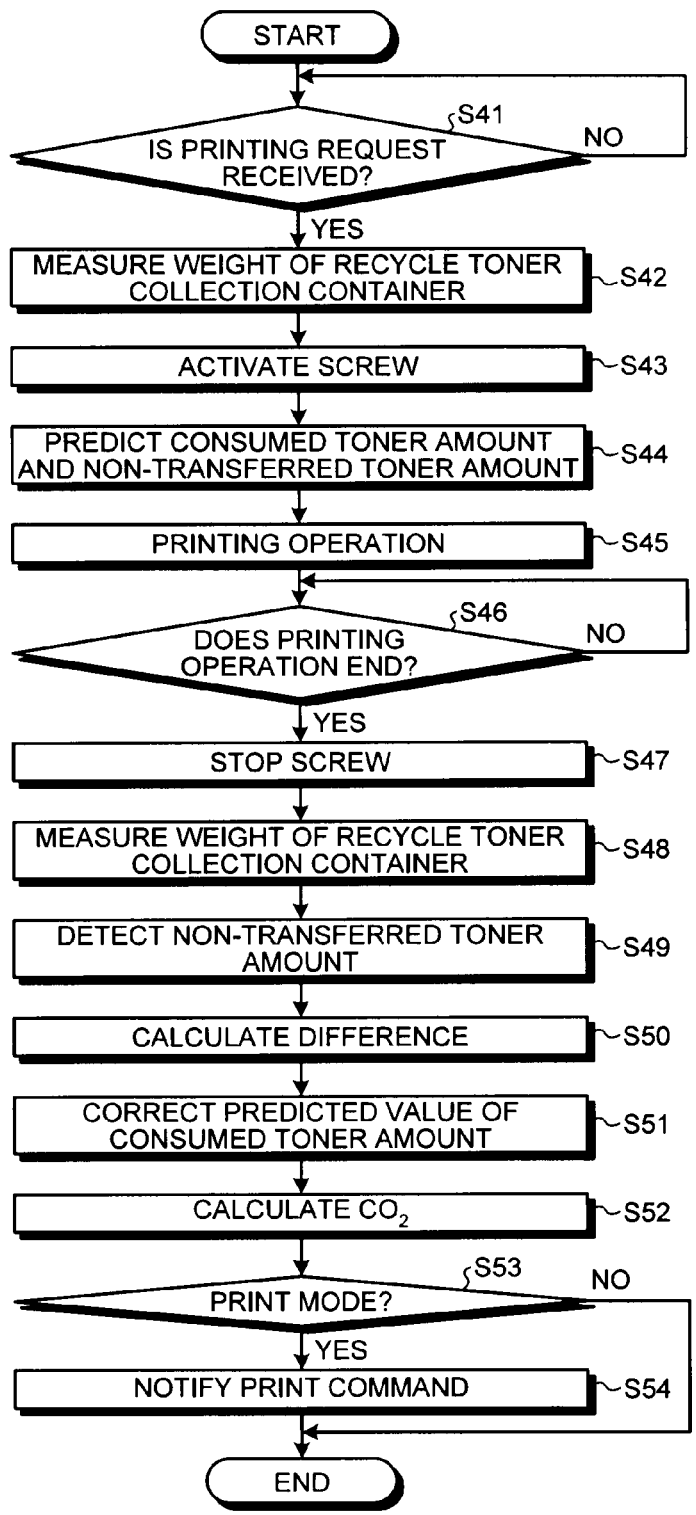
FIG. 10 is a flowchart for explaining an example of $CO_2$ emission amount calculation processing executed by the color image forming apparatus according to the third embodiment.

FIG. 10 is a flowchart for explaining an example of $CO_2$ emission amount calculation processing executed for each one job by the color image forming apparatus 300 according to the third embodiment. Contents of steps S41 to S52 in FIG. 10 are the same as the contents of steps S21 to S32 in FIG. 8.

Therefore, detailed explanation of the contents of steps S41 to S52 is omitted. As shown in FIG. 10, at step S53, the print-command notifying unit 122 (see FIG. 9) determines whether the print mode is selected by the mode selecting unit 120. When the print-command notifying unit 122 determines at step S53 that the print mode is selected, the print-command notifying unit 122 notifies the post-processing machine of a print command for instructing print of the $CO_2$ emission amount calculated at step S52 (step S54). On the other hand, when the print-command notifying unit 122 determines at step S53 that the non-print mode is selected, the processing ends with the print-command notifying unit 122 not notifying the post-processing machine of the print command.

A method of print by the post-processing machine that receives the comment command is arbitrary. For example, the post-processing machine can print the $CO_2$ emission amount in the job on all pieces of the recording paper P printed in the job or can selectively print the $CO_2$ emission amount. For example, when the job is a job for printing a plurality of copies of a booklet including a plurality of pages, the post-processing machine can print the $CO_2$ emission amount only on top pages of booklets.

As explained above, in the third embodiment, when the print mode is selected, a $CO_2$ emission amount calculated for each one job is printed on the recording paper P printed in the job. Therefore, there is an advantage that the user can easily grasp the $CO_2$ emission amount.

Figure 11:
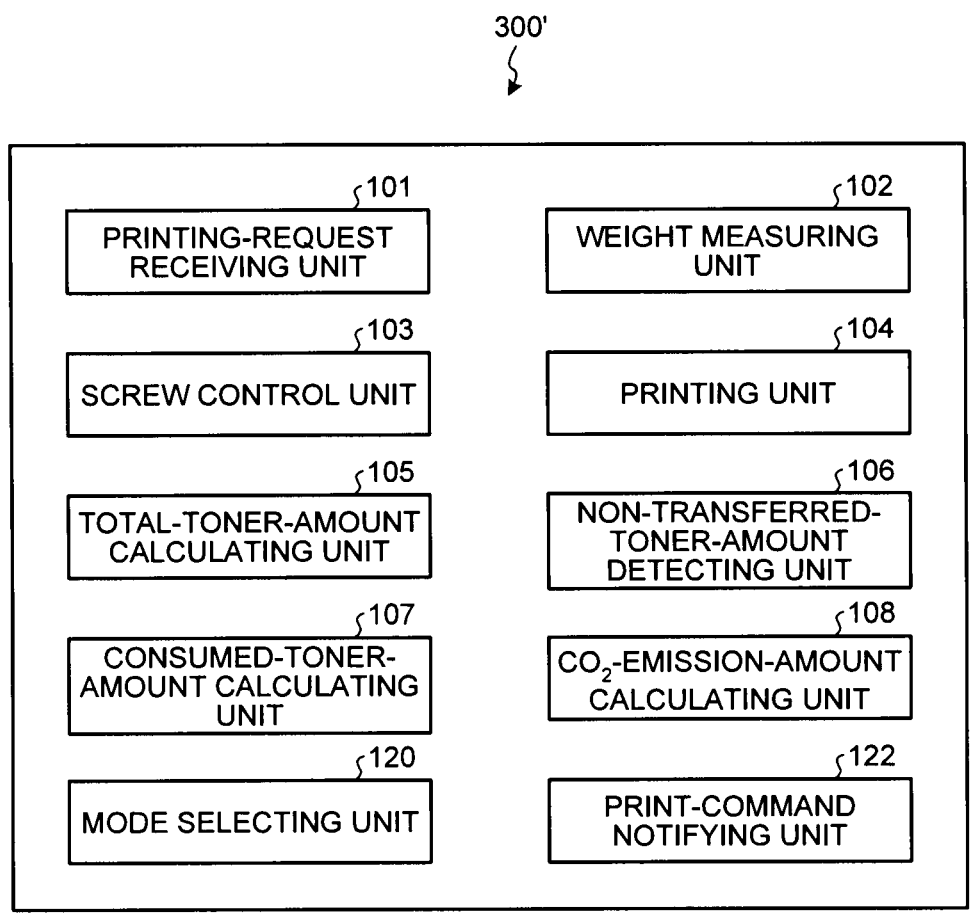
FIG. 11 is a block diagram of an example of a modification of the functional configuration of the color image forming apparatus according to the third embodiment.
Figure 12:
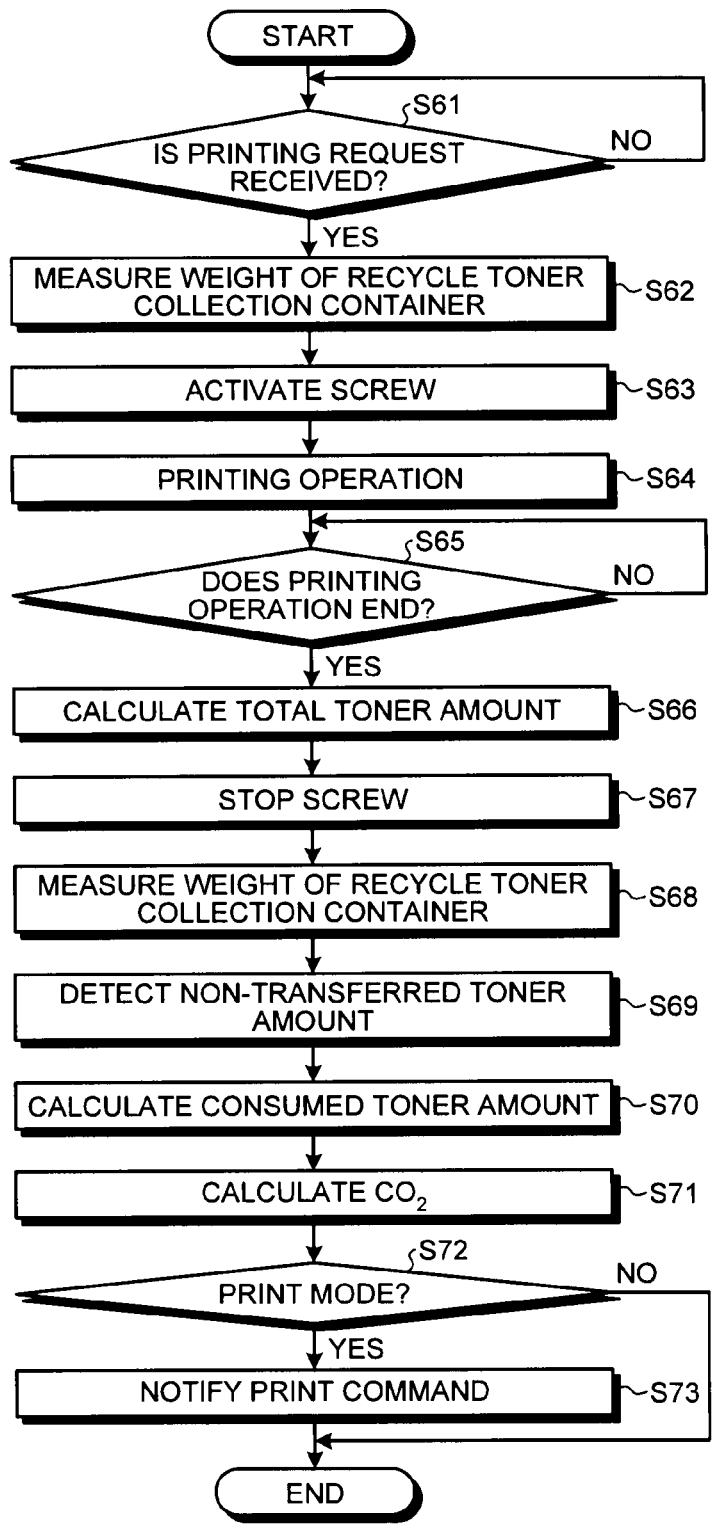
FIG. 12 is a flowchart for explaining an example of a modification of the $CO_2$ emission amount calculation processing executed by the color image forming apparatus according to the third embodiment.

In the example explained above, the mode selecting unit 120 and the print-command notifying unit 122 are added to the functional configuration of the color image forming apparatus 200 according to the second embodiment. However, this is not a limitation. For example, as shown in FIG. 11, the mode selecting unit 120 and the print-command notifying unit 122 can be added to the functional configuration of the color image forming apparatus 100 according to the first embodiment. FIG. 12 is a flowchart for explaining an example of $CO_2$ emission amount calculation processing executed for each one job by a color image forming apparatus 300' in this case. Contents of steps S61 to S71 in FIG. 12 are the same as the contents of steps S1 to S11 in FIG. 6. Contents of steps S72 and S73 in FIG. 12 are the same as the contents of steps S53 and S54 in FIG. 10.

Fourth Embodiment

Figure 13:
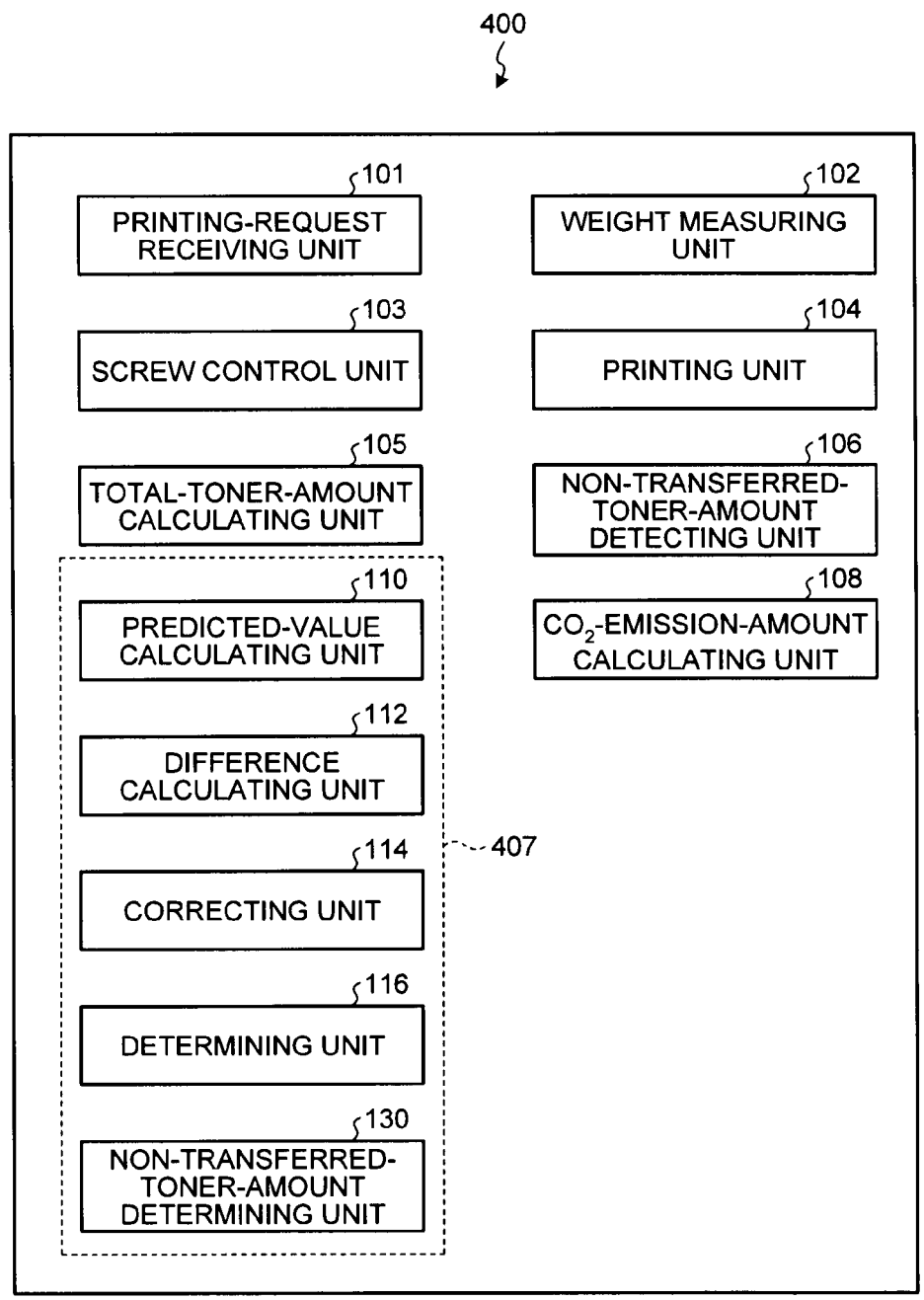
FIG. 13 is a block diagram of an example of a functional configuration of a color image forming apparatus according to a fourth embodiment.

A fourth embodiment is explained. A hardware configuration of a color image forming apparatus according to the fourth embodiment is the same as those in the first and second embodiments. Therefore, detailed explanation of the hardware configuration is omitted. FIG. 13 is a block diagram of an example of a functional configuration of the color image forming apparatus 400 according to the fourth embodiment. As shown in FIG. 13, the consumed-toner-amount calculating unit 407 is different from the second embodiment in that the consumed-toner-amount calculating unit 407 further includes a non-transferred-toner-amount determining unit 130. The non-transferred-toner-amount determining unit 130 determines whether a differential value calculated by the difference calculating unit 112 is within a predetermined range.

The color image forming apparatus 400 according to the fourth embodiment is different from the second embodiment as explained below. When the differential value calculated by the difference calculating unit 112 is within the predetermined value range, the color image forming apparatus 400 determines a predicted value of a consumed toner amount after correction by the correcting unit 114 as a value of the consumed toner amount. On the other hand, when the differential value is outside the predetermined range, the color image forming apparatus 400 determines a predicted value of the consumed toner amount calculated by the predicted-value calculating unit 110 as a value of the consumed toner amount without performing the correction by the correcting unit 114. The other contents are the same as those in the second embodiment. Therefore, detailed explanation of the contents is omitted.

Figure 14:
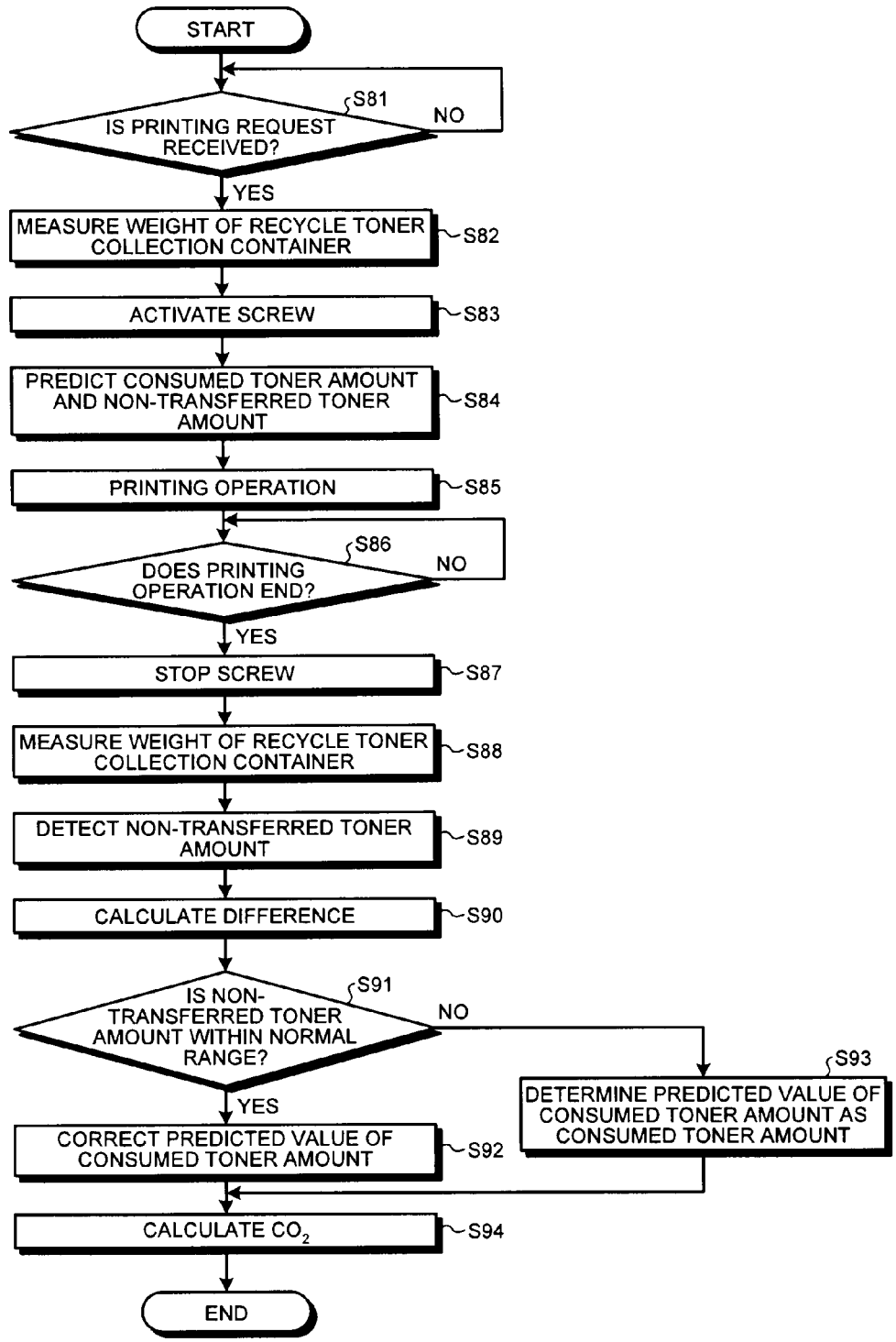
FIG. 14 is a flowchart for explaining an example of $CO_2$ emission amount calculation processing executed by the color image forming apparatus according to the fourth embodiment.

FIG. 14 is a flowchart for explaining an example of $CO_2$ emission amount calculation processing executed for each one job by the color image forming apparatus 400 according to the fourth embodiment. Contents of steps S81 to S90 in FIG. 14 are the same as the contents of steps S21 to S30 in FIG. 8. Therefore, detailed explanation of the contents of steps S81 to S90 is omitted. At step S91 in FIG. 14, the non-transferred-toner-amount determining unit 130 (see FIG. 13) determines whether the differential value calculated at step S90 is within a predetermined range. When the non-transferred-toner-amount determining unit 130 determines that the differential value calculated at step S90 is within the predetermined range, the processing shifts to step S92. At step S92, the correcting unit 114 of the consumed-toner-amount calculating unit 407 corrects, using the differential value calculated at step S90, the predicted value of the consumed toner amount calculated at step S84. The determining unit 116 determines a predicted value of the consumed toner amount after the correction by the correcting unit 114 as a value of the consumed toner amount. Contents of step S92 are the same as the contents of step S31 in FIG. 8.

On the other hand, when the non-transferred-toner-amount determining unit 130 determines that the differential value calculated at step S90 is outside the predetermined range, the processing shifts to step S93. At step S93, the correction by the correcting unit 114 is not performed and the determining unit 116 directly determines the predicted value of the consumed toner amount calculated at step S84 as a value of the consumed toner amount.

Subsequently, the processing shifts to step S94. At step S94, the $CO_2$-emission-amount calculating unit 108 calculates a $CO_2$ emission amount from the consumed toner amount determined by the determining unit 116. Contents of step S94 are the same as the contents of step S32 in FIG. 8.

As explained above, in the fourth embodiment, when the differential value calculated by the difference calculating unit 112 is outside the predetermined range, the color image forming apparatus 400 determines the predicted value of the consumed toner amount calculated by the predicted-value calculating unit 110 as a value of the consumed toner amount without performing the correction by the correcting unit 114. Therefore, it is possible to prevent a consumed toner amount from being calculated based on a wrong detection result. Consequently, it is possible to improve the calculation accuracy of the consumed toner amount.

Fifth Embodiment

A fifth embodiment is explained. The fifth embodiment is different from the first to fourth embodiments in that the function of at least one of the total-toner-amount calculating unit 105 (205), the non-transferred-toner-amount detecting unit 106, the consumed-toner-amount calculating unit 107 (207, 407), and the $CO_2$-emission-amount calculating unit 108 is mounted on an external controller (an external server, DFE: Digital Front End) separate from the image forming apparatus. The fifth embodiment is specifically explained below. Components common to the first to fourth embodiments are denoted by the same reference numerals and signs and explanation of the components is omitted as appropriate.

Figure 15:
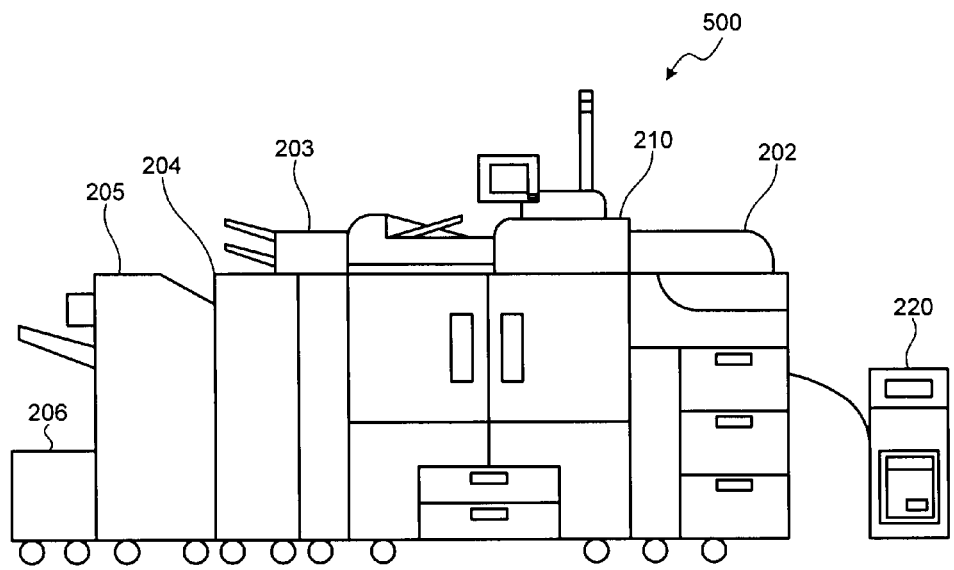
FIG. 15 is an external view of an example of an image forming system according to a fifth embodiment.

FIG. 15 is an external view of an example of an image forming system 500 according to the fifth embodiment. The image forming system 500 is a production printing machine and includes an external controller 220 (hereinafter referred to as "DFE 220"). In the image forming system 500, a large-capacity paper feeding unit 202 that performs paper feeding, an inserter 203 used for using a front cover and the like, a folding unit 204 that performs folding, a finisher 205 that performs stapling, punching, and the like, and a shredder 206 that performs shredding are combined with an image forming apparatus 210 according to uses.

Figure 16:
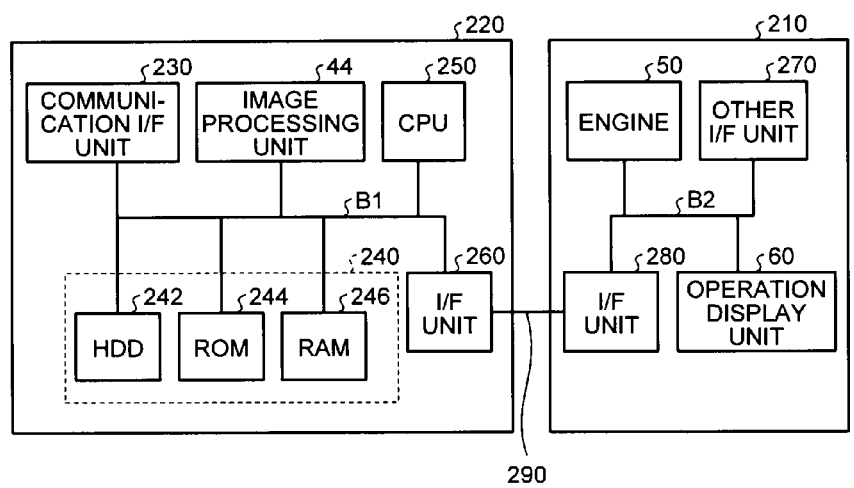
FIG. 16 is a hardware configuration diagram of an example of a DFE according to the fifth embodiment.

FIG. 16 is a hardware configuration diagram of an example of the DFE 220. As shown in FIG. 16, the DFE 220 includes a communication I/F unit 230, a storing unit 240 (a HDD 242, a ROM 244, and a RAM 246), the image processing unit 44, a CPU 250, and an I/F unit 260, which are connected to one another by a bus B1. In the example shown in FIG. 16, the DFE 220 is connected to the image forming apparatus 210 via a leased line 300 to enable high-speed communication. To secure communication speed, the DFE 220 is connected to the image forming apparatus 210 via the leased line 300. However, the DFE 220 and the image forming apparatus 210 can be connected via a network as long as communication speed can be secured.

As shown in FIG. 16, the image forming apparatus 210 includes an I/F unit 280, the engine 50, the operation display unit 60, and an other I/F unit 270, which are connected to one another by a bus B2. The I/F unit 280 is means for connecting the image forming apparatus 210 to the DFE 220. The leased line 290 is connected to the I/F unit 280. The image forming apparatus 210 executes a printing job under the control by the CPU 250 of the DFE 220. In this example, the CPU 250 of the DFE 220 executes the processing executed by the controller 40 in the first to fourth embodiments.

In this embodiment, the CPU 250 of the DFE 220 executes a predetermined control program stored in the storing unit 240, whereby the functions of the total-toner-amount calculating unit 105 (205), the non-transferred-toner-amount detecting unit 106, the consumed-toner-amount calculating unit 107 (207, 407), and the $CO_2$-emission-amount calculating unit 108 are realized. On the other hand, the other functions are realized by the image forming apparatus 210. In other words, in this embodiment, the functions of the total-toner-amount calculating unit 105 (205), the non-transferred-toner-amount detecting unit 106, the consumed-toner-amount calculating unit 107 (207, 407), and the $CO_2$-emission-amount calculating unit 108 are mounted on the DFE 220. On the other hand, the other functions are mounted on the image forming apparatus 210.

This is not a limitation. For example, a part of the functions of the total-toner-amount calculating unit 105 (205), the non-transferred-toner-amount detecting unit 106, the consumed-toner-amount calculating unit 107 (207, 407), and the $CO_2$-emission-amount calculating unit 108 can be mounted on the DFE 220. On the other hand, the functions of the total-toner-amount calculating unit 105 (205), the non-transferred-toner-amount detecting unit 106, the consumed-toner-amount calculating unit 107 (207, 407), and the $CO_2$-emission-amount calculating unit 108 not mounted on the DFE 220 can be mounted on the image forming apparatus 210.

For example, the image forming system 500 can include at least one other external apparatus different from the DFE 220. A part of the functions of the total-toner-amount calculating unit 105 (205), the non-transferred-toner-amount detecting unit 106, the consumed-toner-amount calculating unit 107 (207, 407), and the $CO_2$-emission-amount calculating unit 108 can be mounted on the DFE 220. On the other hand, the functions of the total-toner-amount calculating unit 105 (205), the non-transferred-toner-amount detecting unit 106, the consumed-toner-amount calculating unit 107 (207, 407), and the $CO_2$-emission-amount calculating unit 108 not mounted on the DFE 220 can be mounted on the at least one external apparatus or the image forming apparatus 210.

In short, the image forming system 500 only has to include the image forming apparatus 210 that forms an image on a recording medium and the DFE 220 including at least one of the total-toner-amount calculating unit 105 (205), the non-transferred-toner-amount detecting unit 106, the consumed-toner-amount calculating unit 107 (207, 407), and the $CO_2$-emission-amount calculating unit 108. The DFE 220 serves as a server apparatus.

The control program executed by each of the color image forming apparatuses 100, 200, 300, 300', 400 according to the embodiments can be provided while being recorded in a computer-readable recording medium such as a CD-ROM, a flexible disk (FD), a CD-R, or a DVD (Digital Versatile Disk) as a file of an installable format or an executable format.

The control program executed by each of the color image forming apparatuses 100, 200, 300, 300', 400 according to the embodiments can be stored on a computer connected to a network such as the Internet and provided by being downloaded through the network. The control program executed by each of the color image forming apparatus 100, 200, 300, 300', 400 according to the embodiments can be provided or distributed through the network such as the Internet.

The control program executed by each of the color image forming apparatuses 100, 200, 300, 300', 400 according to the embodiments have a module configuration including the units (the printing-request receiving unit 101, the weight measuring unit 102, the screw control unit 103, the printing unit 104, the total-toner-amount calculating unit 105 (205), the non-transferred-toner-amount detecting unit 106, the consumed-toner-amount calculating unit 107 (207, 407), the $CO_2$-emission-amount calculating unit 108, etc.). As actual hardware, the CPUs respectively mounted on the controller 40, the engine 50, and the operation display unit 60 read out the predetermined control programs from the ROMs or the like and execute the predetermined control programs, whereby the units are loaded onto a main storage and the units are generated on the main storage.

Modification

The embodiments are explained above. However, the present invention is not limited to the embodiments. Various modifications are possible without departing from the spirit of the present invention.

For example, in the embodiments, a $CO_2$ emission amount during image formation is calculated as environmental load information. However, this is not a limitation. A type of the environmental load information is arbitrary. For example, a nitrogen oxide NOx emission amount or a sulfur oxide SOx emission amount during image formation can be adopted as the environmental load information. For example, an amount of chemical substances discharged during toner generation can be adopted as the environmental load information.

In the embodiments, toners remaining on the surfaces of the photosensitive drums 10 without being transferred onto the intermediate transfer belt 16 during transfer (primary transfer) of toner images onto the intermediate transfer belt 16 are collected as non-transferred toners. However, in addition, toners remaining on the intermediate transfer belt 16 without being transferred onto the recording paper P during transfer (secondary transfer) of the toner images transferred onto the surface of the intermediate transfer belt 16 can be collected as non-transferred toners. In short, toners not transferred onto the transfer media (the intermediate transfer belt 16 and the recording paper P) during the transfer of the toner images only have to be collected as non-transferred toners.

In the embodiments, the screw 33 is driven only when non-transferred toners are collected. However, this is not a limitation. The screw 33 can be always activated. However, a configuration in which the screw 33 is activated only when non-transferred toners are collected as in the embodiments has an advantage that power consumption can be reduced compared with a configuration in which the screw 33 is always activated. Further, in the third embodiment, the post-processing machine is incorporated in the image forming apparatus. However, this is not a limitation. The post-processing machine can be provided on the outside of the image forming apparatus.

According to the embodiments, the image forming apparatus calculates, based on a total toner amount and a non-transferred toner amount, a consumed toner amount consumed during image formation. Therefore, there is an advantageous effect that it is possible to improve the calculation accuracy of environmental load information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image carrier;
   a developing unit configured to supply a toner onto a surface of the image carrier to form a toner image, the toner being carried from a toner container;
   a transfer unit configured to transfer the toner image formed by the developing unit onto a transfer medium;
   a cleaning unit configured to collect a non-transferred toner that is not transferred onto the transfer medium during the transfer by the transfer unit;
   a recycle unit configured to carry the non-transferred toner collected by the cleaning unit to the developing unit;
   a non-transferred-toner-amount detecting unit configured to detects a non-transferred toner amount indicating an amount of the non-transferred toner;
   a total-toner-amount calculating unit configured to calculate a total toner amount that is an amount of the toner carried from the toner container;
   a consumed-toner-amount calculating unit configured to calculate a difference between the total toner amount calculated by the total-toner-amount calculating unit and the non-transferred toner amount detected by the non-transferred-toner-amount detecting unit, as a consumed toner amount that is an amount of the toner consumed during the formation of the toner image; and
   an environmental-load-information calculating unit configured to calculate, based on the consumed toner amount calculated by the consumed-toner-amount calculating unit, environmental load information indicating a load imposed on an environment.

2. An image forming apparatus comprising:
   an image carrier;
   a developing unit configured to supply a toner onto a surface of the image carrier to form a toner image, the toner being carried from a toner container;
   a transfer unit configured to transfer the toner image formed by the developing unit onto a transfer medium;
   a cleaning unit configured to collect a non-transferred toner that is not transferred onto the transfer medium during the transfer by the transfer unit;
   a recycle unit configured to carry the non-transferred toner collected by the cleaning unit to the developing unit;
   a non-transferred-toner-amount detecting unit configured to detect a non-transferred toner amount indicating an amount of the non-transferred toner;
   a total-toner-amount calculating unit configured to calculate a total toner amount indicating an amount of the toner carried from the toner container;
   a consumed-toner-amount calculating unit configured to calculate, based on the total toner amount calculated by the total-toner-amount calculating unit and the non-transferred toner amount detected by the non-transferred-toner-amount detecting unit, a consumed toner amount indicating an amount of the toner consumed during the formation of the toner image; and
   an environmental-load-information calculating unit configured to calculate, based on the consumed toner amount calculated by the consumed-toner-amount calculating unit, environmental load information indicating a load imposed on an environment, wherein the total-toner-amount calculating unit calculates the total toner amount based on image data and an image forming condition, and
   the consumed-toner-amount calculating unit includes:
      a predicted-value calculating unit configured to calculate, based on the total toner amount calculated by the total-toner-amount calculating unit and a predetermined transfer ratio, predicted values of the consumed toner amount and the non-transferred toner amount;
      a difference calculating unit configured to calculate a differential value between the predicted value of the non-transferred toner amount calculated by the predicted-value calculating unit and the non-transferred toner amount detected by the non-transferred-toner-amount detecting unit;
      a correcting unit configured to correct, based on the differential value calculated by the difference calculating unit, the predicted value of the consumed toner amount calculated by the predicted-value calculating unit; and
      a determining unit configured to determine, as a value of the consumed toner amount, a predicted value of the consumed toner amount after the correction by the correcting unit.

3. The image forming apparatus according to claim 1, wherein the environmental-load-information calculating unit calculates, for each one job, the environmental load information based on the consumed toner amount in the job.

4. The image forming apparatus according to claim 1, further comprising a display unit configured to display the environmental load information calculated by the environmental-load-information calculating unit.

5. The image forming apparatus according to claim 1, further comprising a printing unit configured to print the environmental load information calculated by the environmental-load-information calculating unit on recording paper onto which the toner image has been transferred.

6. The image forming apparatus according to claim 5, further comprising a mode selecting unit configured to select any one of a first mode for executing the print of the environmental load information and a second mode for not executing the print of the environmental load information, wherein the printing unit executes the print of the environmental information load information when the mode selecting unit selects the first mode.

7. The image forming apparatus according to claim 1, wherein the environmental load information is information indicating an amount of $CO_2$ emission.

8. An image forming method comprising:
supplying a toner onto a surface of an image carrier to form a toner image, the tonner being carried from a toner container;
transferring the formed toner image onto a transfer medium;
collecting a non-transferred toner that is not transferred onto the transfer medium during the transferring;
reusing the collected non-transferred toner to form the toner image;
detecting a non-transferred toner amount indicating an amount of the non-transferred toner;
calculating a total toner amount that is an amount of the toner carried from the toner container;
calculating, a difference between the calculated total toner amount and the detected non-transferred toner amount, as a consumed toner amount that is an amount of the toner consumed during the formation of the toner image; and
calculating, based on the calculated consumed toner amount, environmental load information indicating a load imposed on an environment.

9. A computer program product comprising a non-transitory computer readable medium including programmed instructions, wherein the instructions cause a computer to execute the image forming method according to claim 8.

10. An image forming system comprising an image forming apparatus and a server apparatus, the image forming system comprising:
an image carrier;
a developing unit configured to supply a toner onto a surface of the image carrier to form a toner image, the toner being carried from a toner container;
a transfer unit configured to transfer the toner image formed by the developing unit onto a transfer medium;
a cleaning unit configured to collect a non-transferred toner that is not transferred onto the transfer medium during the transfer by the transfer unit;
a recycle unit configured to carry the non-transferred toner collected by the cleaning unit to the developing unit;
a non-transferred-toner-amount detecting unit configured to detects a non-transferred toner amount indicating an amount of the non-transferred toner;
a total-toner-amount calculating unit configured to calculates a total toner amount that is an amount of the toner carried from the toner container;
a consumed-toner-amount calculating unit configured to calculate a difference between the total toner amount calculated by the total-toner-amount calculating unit and the non-transferred toner amount detected by the non-transferred-toner-amount detecting unit, as a consumed toner amount that is an amount of the toner consumed during the formation of the toner image; and
an environmental-load-information calculating unit configured to calculate, based on the consumed toner amount calculated by the consumed-toner-amount calculating unit, environmental load information indicating a load imposed on an environment, wherein
the image forming apparatus includes at least the image carrier, the developing unit, the transfer unit, the cleaning unit, and the recycle unit, and
the server apparatus includes at least one of the non-transferred-toner-amount detecting unit, the total-toner-amount calculating unit, the consumed-toner-amount calculating unit, and the environmental-load-information calculating unit.

11. The image forming apparatus according to claim 2, wherein
the consumed-toner-amount calculating unit determines, as the value of the consumed toner amount, the predicted value of the consumed toner amount after the correction by the correcting unit when the differential value calculated by the difference calculating unit is within a predetermined range, and
the consumed-toner-amount calculating unit determines, as the value of the consumed toner amount, the predicted value of the consumed toner amount calculated by the predicted-value calculating unit without performing the correction by the correcting unit when the differential value is outside the predetermined range.

* * * * *